United States Patent [19]
Keun et al.

[11] Patent Number: 5,795,480
[45] Date of Patent: Aug. 18, 1998

[54] METHOD AND SYSTEM FOR THE TREATMENT OF LIVESTOCK WASTEWATER

[75] Inventors: Oh Kwang Keun, Seoul; Lee Cheol Woo, Kyungkee province; Jeon Yeong Joong; Lee Jae Heung, both of Seoul, all of Rep. of Korea

[73] Assignee: Cheil Jedang Corporation, Seoul, Rep. of Korea

[21] Appl. No.: 777,239

[22] Filed: Dec. 30, 1996

[30] Foreign Application Priority Data

Dec. 29, 1995 [KR] Rep. of Korea ............ 1995-72239

[51] Int. Cl.$^6$ ............................................. C02F 3/34
[52] U.S. Cl. ............... 210/611; 210/615; 210/748; 210/151
[58] Field of Search ............... 210/605, 610, 210/611, 615–618, 626, 630, 748, 150, 151

[56] References Cited

U.S. PATENT DOCUMENTS

| | | | |
|---|---|---|---|
| 4,135,976 | 1/1979 | Kitajima | 210/611 |
| 4,290,891 | 9/1981 | Ackerman | 210/611 |
| 4,321,141 | 3/1982 | Messing | 210/615 |
| 4,725,357 | 2/1988 | Downing et al. | 210/611 |
| 4,995,980 | 2/1991 | Jaubert | 210/150 |
| 5,087,353 | 2/1992 | Todd et al. | 210/151 |
| 5,599,443 | 2/1997 | Yamasaki et al. | 210/151 |
| 5,637,219 | 6/1997 | Robinson et al. | 210/150 |
| 5,656,169 | 8/1997 | Lugowski et al. | 210/611 |

*Primary Examiner*—Thomas G. Wyse
*Attorney, Agent, or Firm*—Burns, Doane, Swecker & Mathis, L.L.P.

[57] ABSTRACT

A method and system for the treatment of the livestock wastewater which comprises (a) biodegrading the said wastewater with hydrolytic, acidogenic and acetogenic bacteria culture, (b) biodegrading the supernatant from the primary treatment in contact with a biofilm with immobilized photosynthetic bacteria and (c) biodegrading the liquid from the secondary treatment with the activated sludge mixed with photosynthetic and symbiotic bacteria culture.

7 Claims, 3 Drawing Sheets

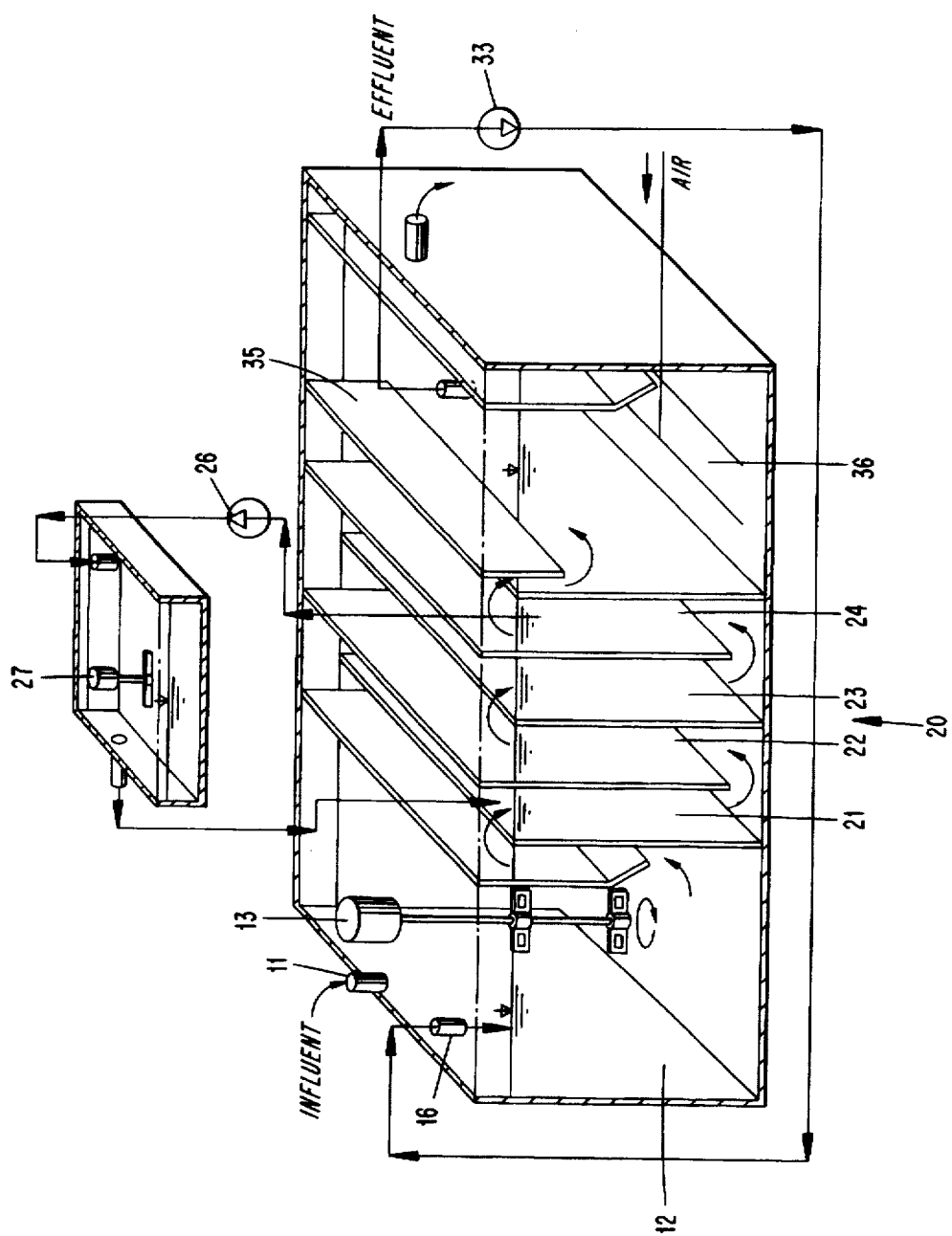

METHOD AND SYSTEM FOR THE TREATMENT OF LIVESTOCK WASTEWATER

BACKGROUND OF THE INVENTION

1. Field of the Invention

The present invention relates to a method for the treatment of livestock wastewater with bacteria. Specifically, the present invention relates to a method for the treatment of swine or cattle wastewater in which the wastewater is degraded with primary hydrolytic, acidogenic and acetogenic bacteria group, secondary photosynthetic bacteria group and tertiary photosynthetic and symbiotic bacteria group.

2. Description of the Prior Art

While a livestock husbandry grows into an industrialized scale, a concern in the treatment of livestock wastewater is being increased. The livestock wastewater includes organic materials 10 to 20 times as much as domestic sewage, and a high concentration of nutritive salts such as nitrogen and phosphorus. Such livestock wastewater would be treated by various conventional methods.

The solid livestock excrements are dried and then used as fertilizer or energy. However, this drying method requires much energy and is beset with difficulties in managing such solid fertilizer. Alternatively, the solid excrements are processed into composts through initial and secondary fermentations. However, such fermenting requires high temperature, artificial aeration and much time.

The slurry livestock excrements are processed into liquid composts or by anaerobic fermentation. The slurry excrements are digested by thermophilic bacteria under aeration and the liquid obtained therefrom is used as fertilizer. However, a great amount of the liquid fertilizer tends to be discarded and extra farmland is necessary as reservoir for the liquid fertilizer. Alternatively, the slurry excrements are converted into energy through methanogenesis. This fermentation process is useful is producing energy (methane gas), but it is not effective since it is necessary to re-treat the ferment solutions and supernatants.

Currently available biological treatment processes for purifying the livestock wastewater include for example activated sludge, biofilm (trickling filter, depositing filter, rotating biological contactor and the like) and oxidation ponds. In addition, extended aeration system, two-step aeration system and oxidation ditch are available for the treatment of the livestock wastewater. These treatment processes require diluting of the wastewater to approximately BOD 1,000 mg/l before it is received into a biological treatment system.

Alternatively, the livestock wastewater can be processed by soil treatment or evaporation treatment. According to the soil treatment process, the fouling water is flowed into porous pipes laid under the soil and is decomposed by complex biochemical reactions in the soil. This process is not preferable in that the pipes get stuffed up and nitrogen components soak into the soil. The evaporation treatment process comprises evaporating the urine with solar or wind energy or the heat energy generated during the composting. However, this process is disadvantageous because it requires wide land and expensive operation costs. Moreover, it is not only difficult to apply this process during the winter season but it also requires prevention of foul odor.

As livestock farming is growing larger in scale, a steady development of efficiently improved treatment system for the livestock wastewater is required.

SUMMARY OF THE INVENTION

The present invention provides a method for the treatment of the livestock wastewater which comprises (a) biodegrading the said wastewater by mixing it with hydrolytic, acidogenic and acetogenic bacteria culture;

(b) biodegrading the supernatant from the primary treatment by contacting it with a biofilm with immobilized photosynthetic bacteria; and (c) biodegrading the liquid from the secondary treatment by mixing it with the activated sludge mixed with photosynthetic and symbiotic bacteria culture.

In addition, the present invention provides a system for the treatment of livestock wastewater comprised of (a) an acid-forming tank including hydrolytic, acidogenic and acetogenic bacteria culture for the primary treatment of the wastewater, (b) a biofilm reactor with immobilized photosynthetic bacteria for the secondary treatment of the supernatant transferred from the acid-forming tank and (c) a symbiotic tank including photosynthetic and symbiotic bacteria culture for the advanced treatment of the liquid transferred from the biofilm reactor.

BRIEF DESCRIPTION OF THE DRAWING

FIG. 3 is a perspective view of the livestock wastewater treatment compact system of the present invention illustrating the flow for the purification of the livestock wastewater.

DETAILED DESCRIPTION OF THE INVENTION

The amount of the excrements from domestic animals varies depending on the species and weight of the animal, kind of fodder, amount of water fed to the animal, method of raising the animal, etc. The excrement concentration also varies depending on amount of water used to clean the pen, manner of feeding water to the livestock process of separating concentrated excrement liquid, etc. However, generally, the amount of excrements from a mature swine is approximately 6 kg/day and the BOD is 130 g/day. For a mature cattle, the excrement amount is approximately 35 kg/day and the BOD is 13 g/day. Although it could be varied by the aforementioned parameters, when the cattle and swine excrements collected from several pens were independently analyzed, the composition thereof was measured as shown in Table I below.

TABLE I

|  | feces | | urine | |
| --- | --- | --- | --- | --- |
|  | cattle | swine | cattle | swine |
| excrement amount (kg/day/animal) | 20 to 30 | 3 to 4 | 7 to 8.1 | 3 to 4.1 |
| water content (%) | 82 to 90 | 80 to 85 | 92 to 93 | 96 to 97 |
| organic material content (%) | 8 to 15 | 15 to 16 | 3.2 to 5.7 | 2.3 to 2.5 |
| $BOD_5$ (mg/l) (average) | 38,420 | 68,280 | 13,000 | 3,885 |
| suspended solid amount (mg/l) | 120,000 | 220,000 | 5,000 | 4,500 |

In addition, the mixture of the swine and cattle excrements were analyzed and the results were shown in Table II below.

TABLE II

| Parameter | conc. range | ave. conc. |
| --- | --- | --- |
| pH | 7.5 to 9.0 | 8.5 |
| $BOD_5$ (mg/l) | 3,500 to 50,000 | 10,500 |
| $COD_{Cr}$ (mg/l) | 4,000 to 80,000 | 14,000 |
| $COD_{Mn}$ (mg/l) | 1,000 to 12,000 | 4,500 |
| $PO_4$—P (mg/l) | 40 to 350 | 160 |
| $NH_4$—N (mg/l) | 300 to 3,500 | 1,400 |

According to the method of the present invention, the livestock excrements containing a large amount of nutritive salts as mentioned above are biodegraded as follows: primarily, composite organic materials are degraded to organic acids by a hydrolytic and acidogenic bacteria group and propionic and branched fatty acids are degraded to acetic acid by acetogenic bacteria in a closed tank; secondarily, monosaccharides, amino acids, organic acids, nitrogen and the like are decomposed through a biofilm reactor with immobilized photosynthetic bacteria; and tertiary, the remaining organic materials are completely digested by a photosynthetic and symbiotic bacteria group.

Figure 1:
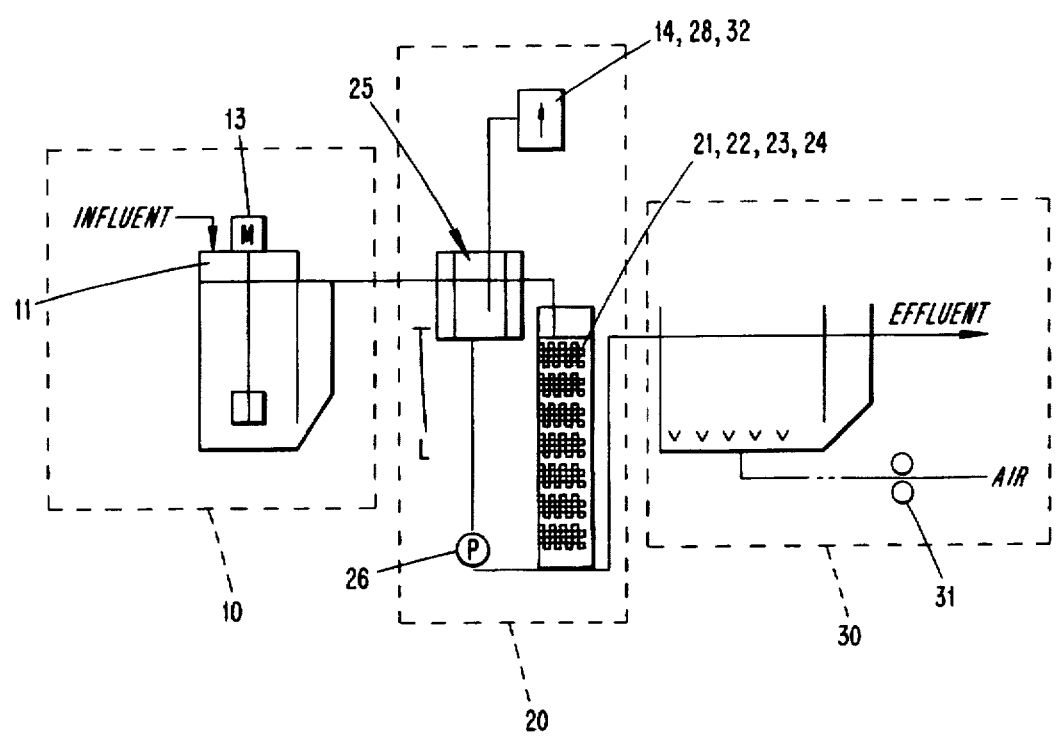
FIG. 1 is a functional view of the livestock wastewater treatment system according to the present invention.

The functional elements for purification of the livestock wastewater according to the method of the present invention is illustrated in FIG. 1. The livestock 2 wastewater influent is received through inlet 11 on the upper of the primary acid-forming tank 10. It is preferred to conduct the pretreatment for removing the suspended solids or particles in the wastewater before it is introduced into the tank 10. Such a pretreatment is conventional and not critical for the present invention. The tank 10 is a continuously stirred tank reactor. The introduced wastewater is retained for 3 to 6 days in the tank 10 and is continuously stirred by the agitator 13 over the working. Approximately one-tenth from the bottom of the tank 10 functions as a space to prevent the inflow of the solids, which settle on the bottom of the tank 10, into the secondary biofilm reactor 20. The supernatant liquid flows into the upper of the secondary biofilm 20 for further treatment.

The secondary biofilm reactor 20 is equipped with light illuminator L, pH regulator 14, 28, 32 and circulation container 25. The liquid is circulated by the circulation pump 26 within the reactor 20, with the preferred circulation being 9 to 10 cycles per day at 0.15 m/hr of linear velocity each cycle, and is illuminated continuously by combined daylight and artificial light. The pH of the liquid in the biofilm reactor 20 is adjusted to a range from 7.2 to 8.5. The resulting suspension flows from the bottom of the biofilm reactor 20 to the upper of the tertiary photosynthetic and symbiotic bacteria culture tank 30 for advanced treatment.

The secondary biofilm reactor according to the present invention is a packed-bed column reactor in which biofilms 21, 22, 23, 24 are formed by immobilizing the photosynthetic bacteria to the fixed carriers. The carriers include, for example, inorganic carriers such as activated carbon, celite, aluminar, silica, porous ceramic and zeolite. The biofilm in which the photosynthetic bacteria was immobilized to activated carbon or porous ceramic bead is preferred for the present invention.

The tertiary tank 30 for advanced treatment includes a mixture of photosynthetic and symbiotic bacteria populations with an ordinary activated sludge. The liquid from the secondary tank reactor 20 is retained for 1.5 to 3 days. The photosynthetic and symbiotic bacteria culture tank reactor 30 is aerated by the blower 31 on the bottom of the reactor 30. The reactor 30 is to increase the organic material treatment capacity and to enhance sludge precipitation, and is stable when the wastewater loading rate is fluctuating.

Figure 2:
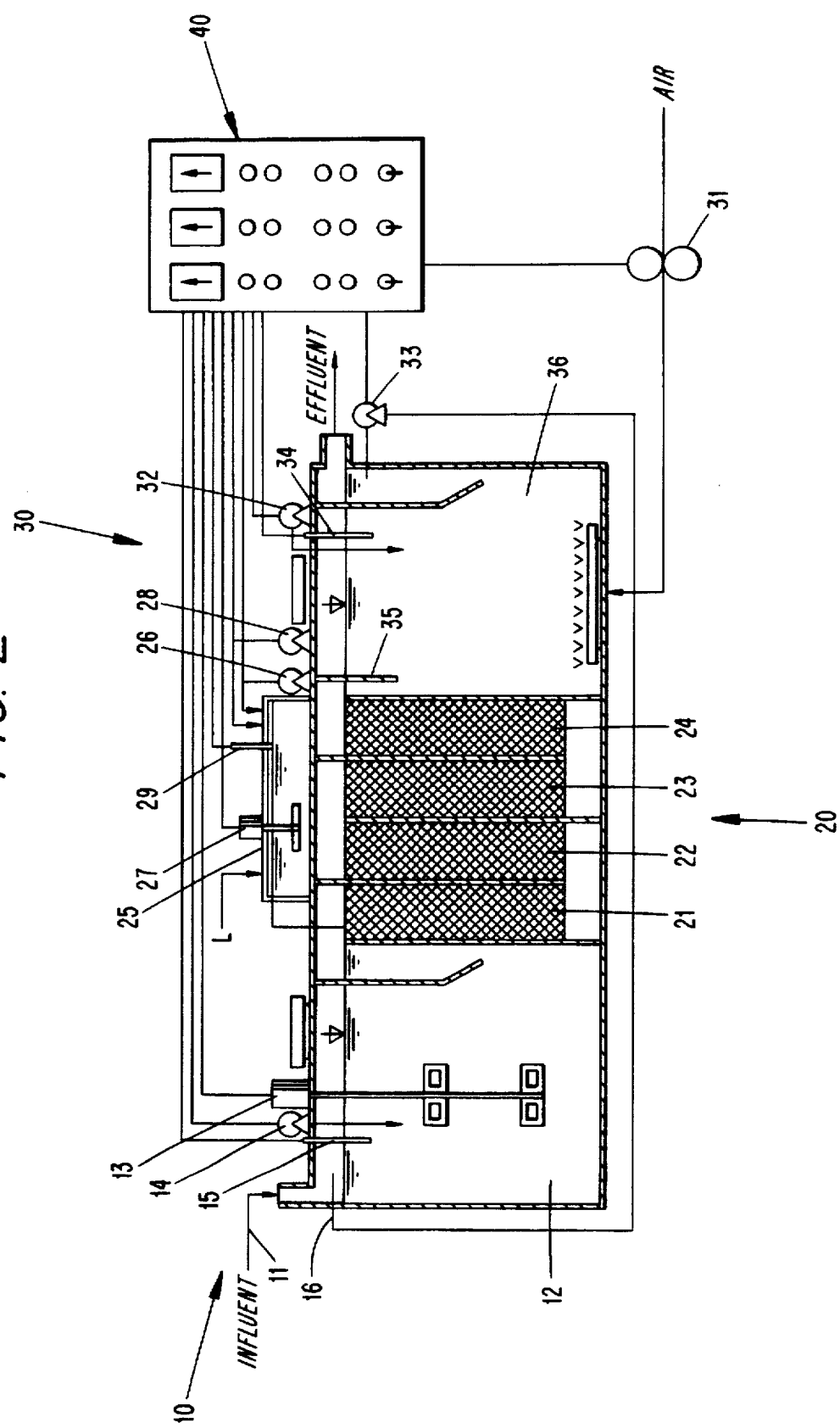
FIG. 2 is a front sectional view through the livestock wastewater treatment compact system embodying the present invention.

It is possible to construct the mechanical system required for carrying out the method of the present invention in a compact form as shown in FIGS. 2 and 3. It is only for a better understanding of the method of the present invention and it should be understood that many variations and changes thereof within the spirit of the present invention can be applied by those skilled in the art. All of such variations and changes should be included in the scope of the present invention.

As shown in FIGS. 2 and 3, the wastewater treatment compact system of the present invention is a single unit tank (1200'3600×1500 H, vol. 6,000 l) in which three compartments exist, with the volume of each compartment being 2,000 l (1,200×1,200×1,500 H). Compartment Nos. 1, 2 and 3 are used as primary acid-forming reactor 10, secondary biofilm reactor 20 and tertiary reactor 30, respectively. The suitable material for the wastewater treatment system of the present invention is FRP.

A 200 l portion from the bottom of the primary reactor 10 is used as the area 12 for settling solid materials in the wastewater which has been received through the inlet 11 on the top of the primary reactor 10. The deposit area 12 functions to prevent solids from flowing into the secondary reactor 20. The wastewater to be treated in the primary reactor 10 is stirred by the agitator 13 at the low velocity of approximately 60 rpm and the pH of the wastewater is maintained by the pH regulating pump 14 to approximately 5.5.

The biofilm reactor 20 includes four columns in a series. The volume of each column is 500 l and each column is filled with approximately 1,400 to 1,500 cubical Polyurethane Foams (PUF, 20×20×20). The supernatant transferred from the primary reactor 10 to the secondary reactor 20 down-flows to the bottom of the first column 21. Subsequently, the liquid from the first column 21 flows upward into the second column 22, the liquid from the second column 22 down-flows into the third column 23 an the liquid from the third column 23 flows upward into the fourth column 24. The liquid from the fourth column flows into the tertiary reactor 30 or is forcibly introduced by the circulation pump 26 into the circulation container 25 (1,000×1,200×200 H, vol. 240 l) which is installed on the top of the biofilm reactor 20. The liquid transferred from the third column 23 to the circulation container 25 is re-flowed through the columns 21, 22, 23 and 24. The suitable velocity of the circulation is approximately 12 cycles per day. The liquid in the circulation container 25 is continuously stirred by the agitator 27 installed on the upper of the container 25. The suitable stirring rate is approximately 120 rpm. The pH of the liquid in the circulation container is adjusted to the range from 7.5 to 8.0 by the pH regulating pump 28 on the left of the top of the tertiary reactor 30.

The plate 35 is installed in the inner of the top of the tertiary reactor 30 to prevent the liquid in the reactor 30 to flowing backward into the fourth column 24 of the biofilm reactor 20. The 300 l portion of the tertiary reactor 30 is used as the area 36 for settling the sludge. The remaining 1,700 l portion in the tertiary reactor 30 is aerated at the airflow rate of 0.5 $m^3$ to 1 $m^3$/min by the blower 31 on the bottom of the reactor 30 to maintain the DO in a range from 2 to 4 ppm. The pH of the liquid in the tertiary reactor 30 is adjusted to a range from 6.5 to 7.0 by the pH regulating pump 32 on the right of the top of the tertiary reactor 30. For the complete treatment of nitrogen components, the supernatant in the tertiary reactor 30 is re-circulated by the circulation pump 33 through the inlet 16 of the primary reactor 10. The suitable amount of the supernatant to be re-circulated is 1 to 2 times as much as the original influent wastewater.

The pH electrodes 15, 29, 34, which are installed on the primary reactor 10, circulation container 25 and tertiary reactor 30, respectively, agitators 13, 27, pH regulating pumps 14, 28, 32, circulation pumps 26, 33 and blower 31 are automatically processed by the control box 40.

The photosynthetic bacteria used in the present invention is Rhodopseudomonas sp. and Rodospirillum sp., readily available from depository organizations or laboratories. These bacteria can be also easily isolated from the soil as follows: soil samples, which are expected to include such bacteria, are added to 25 ml of medium (which contains 1.0 g of ammonium sulfate, 0.2 g of $MgSO_4 \cdot 7H_2O$, 0.075 g of $CaCl_2 \cdot 2H_2O$, 4.0 g of malic acid, 0.9 g of $K_2HPO_4$, 0.6 g of $KH_2PO_4$, 20 mg of EDTA, 12 mg of $FeSO_4 \cdot 7H_2O$, 1.0 mg of thiamine, 15 mg of biotin and 1 ml of trace element solution (700 mg of $H_2BO_2$, 398 mg of $MnSO_4 \cdot H_2O$, 188 mg of $Na_2MoO_4 \cdot ZH_2O$, 60 mg of $ZnSO_4 \cdot 7H_2O$, 10 mg of $Cu(NO_2)_2 \cdot 3H_2O$ and $CoCl_2 \cdot 6H_2O$ in 250 ml of distilled water) in 1 l of distilled water) in 250 ml Erlenmeyer flask. Then, nitrogen gas is injected into the flask for 1 to 2 minutes before the flask is clogged. Cultivation is conducted at the temperature of 28° to 32° C. under illumination of approximately 5,000 lux by a tungsten lamp for 3 to 5 days. The resulting liquid culture is plated on the agar medium to separate the desired photosynthetic bacteria. This separated bacteria is cultured on an enrichment medium (which contains 3 g of sodium acetate, 0.3 g of ammonium sulfate, 0.5 g of $K_2HPO_4$, 0.2 g of magnesium sulfate, 0.1 g of sodium chloride, $FeCl_2 \cdot 6H_2O$, 50 mg of $KCl \cdot 2H_2O$ and 10 mg of yeast extract in 1 l of water) at the temperature of 28° to 32° C. under continuous illumination of light for 3 to 5 days.

When the cattle and swine wastewater collected from several pens is processed through the treatment system of the present invention, the wastewater is purified as shown in Table III below.

EXAMPLE 1

Culture of photosynthetic bacteria

The photosynthetic bacteria Rhodopseudomonas sp. or Rhodospirillum sp., obtained from the Korean Culture Center of Microorganisms, were grown in an enrichment medium which contains 3 g of sodium acetate, 0.3 g of ammonium sulfate, 0.5 g of $K_2HP)_4$, 0.2 g of magnesium sulfate, 0.1 g of sodium chloride, $FeCl_2 \cdot 6H_2O$, 50 mg of $KCl \cdot 2H_2O$ and 10 mg of yeast extract in 1 l of water at the temperature of 29° C. for 4 days. During that time, the culture was continuously illuminated by a tungsten lamp for 4 days.

Formation of biofilm with photosynthetic bacteria 3 g of Glucose, 1.5 g of ammonium sulfate, 0.5 g of $K_2HPO_4$, 0.2 g of magnesium sulfate, 0.1 g of NaCl, 5 mg of $FeCl_2 \cdot 6H_2O$, $CaCl_2 \cdot 2H_2O$ and 10 mg of yeast extract were added to 1 l of water to prepare the synthetic wastewater I with 3,000 mg/l of COD. This synthetic wastewater I was mixed with the previously obtained photosynthetic bacteria culture in ratio of 1:1. The mixtures were flowed into a packed-bed reactor (60(ø)×400(H)mm, vol. 1130 ml) charged with porous ceramic beads. The flowing was continued for 3 days, with the retention time being 1 day. 20 g of Glucose, 10 g of ammonium sulfate, 0.5 g of $K_2HPO_4$, 0.2 g of magnesium sulfate, 0.1 g of NaCl, 5 mg of $FeCl_3 \cdot 6H_2O$, 50 mg of $CaCl_2 \cdot 2HO$ and 10 mg of yeast extract were added to 1 l of water to prepare the synthetic wastewater II with 20,000 mg/l of COD. This synthetic wastewater II was subsequently flowed into the reactor during 10 days while retaining it for 1 day to form the desired photosynthetic bacteria biofilm.

Thereafter, the wasteliquid transferred from the first acid-forming tank was continuously flowed into the biofilm reactor during 10 days while retaining it for 1 day, so that the biofilm was thickened and adapted to the wastewater.

Treatment of swine and cattle wastewater

The swine and cattle wastewater, with BOD being 10,500 mg/l, was collected and the pH was adjusted to 7.0. The wastewater was fed into the primary acid-forming tank and was retained for 3 days. Subsequently, the supernatants from the primary tank were transferred to the secondary biofilm reactor and retained for 3 days. During the period, the suspension in the biofilm reactor was circulated by a circulating pump at 0.15 m/hr of linear velocity and pH was adjusted to 7.2. The suspension from the secondary biofilm

TABLE III

| Parameter (mg/l) | Influent | After the primary treatment in the acid-forming tank | After the secondary treatment in the photosynthetic bacteria biofilm reactor | After the advanced treatment in the photosynthetic and symbiotic bacteria culture tank | Effluent |
|---|---|---|---|---|---|
| $BOD_5$ | 7,000 to 13,000 | 5,000 to 6,500 | 350 to 600 | 35 to 60 | 35 to 45 |
| $COD_{Cr}$ | 11,000 to 16,000 | 6,800 to 9,200 | 520 to 730 | 48 to 76 | 39 to 58 |
| $COD_{Mn}$ | 4,200 to 4,600 | 2,500 to 3,950 | 140 to 310 | 19 to 38 | 14 to 27 |
| $PO_4$—P | 130 to 190 | 72 to 114 | 23 to 45 | 12 to 21 | 11 to 22 |
| $NH_4$—N | 1,200 to 1,800 | 870 to 1,320 | 115 to 235 | 57 to 112 | 55 to 105 |

It is believed that the treatment method of the present invention is more effective than the conventional treatment methods in purifying the livestock wastewater containing a great amount of nutritive salts.

The following examples are given merely as illustrates of the present invention and demonstration of the preferred embodiments of the present invention, and are not to be considered as limiting.

reactor was finally transferred to the tertiary photosynthetic and symbiotic bacteria culture tank reactor and retained during 3 days. The BOD (biochemical oxygen demand), COD (chemical oxygen demand), nitrogen and phosphorus were analyzed by Standard Methods for the Examination of Water and Wastewater (APHA, AWWA, WPCF, Washington, D.C., 17th Ed. (1989)). The treatment efficiency of each tank were measured and the results were shown in Table IV below:

TABLE IV

| Parameter | | After treatment in the primary tank | After treatment in the secondary tank | After treatment in the tertiary tank | effluent | Total removal efficiency (%) |
|---|---|---|---|---|---|---|
| $BOD_5$ | ave. conc. (mg/l) | 6,000 | 450 | 44 | 35 | 99.7 |
| | removal efficiency (%) | 42.9 | 92.5 | 90.2 | | |
| $COD_{Cr}$ | ave. conc. (mg/l) | 8,000 | 620 | 57 | 49 | 99.7 |
| | removal efficiency (%) | 42.9 | 92.3 | 90.8 | | |
| $COD_{Mn}$ | ave. conc. (mg/l) | 3,200 | 210 | 24 | 18 | 99.6 |
| | removal efficiency (%) | 28.9 | 93.4 | 88.6 | | |
| $PO_4$—P | ave. conc. (mg/l) | 95 | 32 | 15 | 15 | 90.6 |
| | removal efficiency (%) | 40.6 | 66.3 | 53.1 | | |
| $NH_4$—N | ave. conc. (mg/l) | 1,150 | 160 | 83 | 80 | 94.3 |
| | removal efficiency (%) | 17.9 | 86.1 | 48.1 | | |

COMPARATIVE EXAMPLES 1 TO 3

The same wastewater as used in Example 1 was fed into a closed continuous stirred tank reactor (140(ø)×200(H)mm, vol. 3077 ml;) and retained for 30 days. The treatment of the liquid was performed according to a conventional activated sludge process(Comparative Example 1), a combined activated sludge and oxidation ponds process (Comparative Example 2) and a conventional oxidation ditch process (Comparative Example 3). The results of the treatment are indicated in Table V below.

TABLE V

| | Comparative Example 1 | | Comparative Example 2 | | Comparative Example 3 | |
|---|---|---|---|---|---|---|
| Parameter | effluent (mg/l) | removal efficiency (%) | effluent (mg/l) | removal efficiency (%) | effluent (mg/l) | removal efficiency (%) |
| $BOD_5$ | 2,083 | 75.5 | 680 | 92 | 187 | 97.8 |
| $COD_{Mn}$ | 1,201 | 65.7 | 221 | 93.7 | 357 | 89.8 |
| $PO_4$—P | 65 | 46.1 | 64 | 46.6 | 54 | 64.8 |
| $NH_4$—N | 760 | 45.7 | 315 | 77.5 | 402 | 71.3 |

EXAMPLE 2

The treatment of the wastewater was performed according to a similar method as described in Example 1, but BOD concentration, BOD loading rate and wastewater retention time were varied. The results are set forth in Table VI below.

TABLE VI

| BOD in influent (mg/l) | BOD loading rate (kg/m³/day) | retention time (day) | BOD in effluent (mg/l) |
|---|---|---|---|
| 10,500 | 0.40 | 26 | 35 |
| | 0.81 | 13 | 35 |
| | 1.21 | 8.7 | 37 |

TABLE VI-continued

| BOD in influent (mg/l) | BOD loading rate (kg/m³/day) | retention time (day) | BOD in effluent (mg/l) |
|---|---|---|---|
| | 1.62 | 6.5 | 44 |
| | 2.44 | 4.3 | 55 |
| | 3.23 | 3.25 | 61 |
| | 4.84 | 2.17 | 87 |
| 20,000 | 0.8 | 26 | 35 |
| | 2.4 | 8.7 | 43 |
| | 4.8 | 4.3 | 59 |
| | 9.7 | 2.17 | 95 |

From the above results, it appears that according to the present invention, when the livestock wastewater is treated at 10 kg/m of BOD loading rate, BOD in the effluent will be reduced to approximately 100 mg/l or less. Therefore, the BOD removal efficiency according to the present invention is as high as 99%.

What is claimed is:

1. A process for the treatment of livestock wastewater which comprises
   (a) biodegrading the said wastewater by mixing it with hydrolytic, acidogenic and acetogenic bacteria culture;
   (b) biodegrading the supernatant from the primary treatment by contacting it with a biofilm with immobilized photosynthetic bacteria; and
   (c) biodegrading the liquid from the secondary treatment by mixing it with an activated sludge mixed with photosynthetic and symbiotic bacteria culture.

2. The process according to claim 1 wherein, in the secondary treatment, the said photosynthetic bacteria immobilized on the biofilm includes Rodopseudomonas sp. or Rhodospirillum sp.

3. A system for the treatment of livestock wastewater, the system comprising:
   (a) an acid-forming tank including hydrolytic, acidogenic and acetogenic bacteria culture for the primary treatment of the wastewater;

(b) a biofilm reactor with immobilized photosynthetic bacteria for the secondary treatment of the supernatant transferred from the acid-forming tank; and (c) a symbiotic tank including photosynthetic and symbiotic bacteria culture for the advanced treatment of the liquid transferred from the biofilm reactor.

4. The system according to claim 3 wherein the said primary acid-forming tank includes a continuous stirred tank reactor.

5. The system according to claim 3 wherein the said secondary biofilm reactor includes a packed-bed reactor.

6. The system according to claim 5 wherein, in the secondary biofilm reactor, the said photosynthetic bacteria immobilized on the biofilm includes Rodopseudomonas sp. or Rhodospirillum sp.

7. The system according to claims 5 or 6, which comprises a means capable of circulating the suspension in the biofilm reactor at 0.15 m/hr of linear velocity while illuminating by combined daylight and artificial light.

* * * * *